United States Patent
Chung et al.

(10) Patent No.: US 10,476,068 B2
(45) Date of Patent: Nov. 12, 2019

(54) BATTERY MODULE INCLUDING PROBE FOR DETECTING EXPANSION OF BATTERY CELL

(71) Applicant: LG Chem, Ltd., Seoul (KR)

(72) Inventors: Seung Hyun Chung, Daejeon (KR); Chae Ah Kim, Daejeon (KR); Se Mi Park, Daejeon (KR)

(73) Assignee: LG Chem, Ltd. (KR)

( * ) Notice: Subject to any disclaimer, the term of this patent is extended or adjusted under 35 U.S.C. 154(b) by 63 days.

(21) Appl. No.: 15/555,858

(22) PCT Filed: Sep. 29, 2016

(86) PCT No.: PCT/KR2016/010900
§ 371 (c)(1),
(2) Date: Sep. 5, 2017

(87) PCT Pub. No.: WO2017/061728
PCT Pub. Date: Apr. 13, 2017

(65) Prior Publication Data
US 2018/0047972 A1 Feb. 15, 2018

(30) Foreign Application Priority Data
Oct. 6, 2015 (KR) .................. 10-2015-0140182

(51) Int. Cl.
*H01M 2/34* (2006.01)
*H01M 10/48* (2006.01)
(Continued)

(52) U.S. Cl.
CPC ........... *H01M 2/34* (2013.01); *H01M 2/0237* (2013.01); *H01M 2/0275* (2013.01);
(Continued)

(58) Field of Classification Search
CPC ..................................... H01M 2/345
See application file for complete search history.

(56) References Cited

U.S. PATENT DOCUMENTS

2004/0247994 A1* 12/2004 Masuda ............... H01M 2/345
429/66
2006/0093896 A1* 5/2006 Hong .................. H01M 2/34
429/61
(Continued)

FOREIGN PATENT DOCUMENTS

JP 2000077043 A 3/2000
JP 2008535174 A 8/2008
(Continued)

OTHER PUBLICATIONS

Machine Translation of KR20130037863A (Dec. 12, 2018) (Year: 2018).*
(Continued)

Primary Examiner — Matthew J Merkling
(74) Attorney, Agent, or Firm — Lerner, David, Littenberg, Krumholz & Mentlik, LLP

(57) ABSTRACT

The present invention relates to a battery module that includes a probe for detecting expansion of a battery cell. More particularly, the present invention relates to a battery module including: two or more of rechargeable battery cells; a sensing probe provided at an external surface of at least one of the battery cells to sense a local expansion change of the battery cell and transmitting a signal; and a controller receiving the signal from the sensing probe, estimating an internal pressure of the battery cell from the received signal, and generating a warning signal to assure safety of the battery module when the estimated internal pressure exceeds a threshold pressure level.

15 Claims, 6 Drawing Sheets

(51) Int. Cl.
  *H01M 2/10* (2006.01)
  *H01M 2/02* (2006.01)
  *H01M 10/42* (2006.01)

(52) U.S. Cl.
  CPC ......... *H01M 2/1016* (2013.01); *H01M 2/345* (2013.01); *H01M 10/425* (2013.01); *H01M 10/48* (2013.01); *H01M 10/482* (2013.01); *H01M 2200/20* (2013.01); *H01M 2220/20* (2013.01)

(56) References Cited

U.S. PATENT DOCUMENTS

| | | | | |
|---|---|---|---|---|
| 2006/0246345 | A1* | 11/2006 | Yoon | H01M 10/4207 429/62 |
| 2007/0054157 | A1 | 3/2007 | Ryu et al. | |
| 2007/0210752 | A1 | 9/2007 | Yoon | |
| 2009/0246607 | A1 | 10/2009 | Shinyashiki et al. | |
| 2011/0039147 | A1 | 2/2011 | Cheon et al. | |
| 2011/0274955 | A1* | 11/2011 | Park | H01M 2/0212 429/94 |
| 2012/0133521 | A1* | 5/2012 | Rothkopf | G01R 31/024 340/636.1 |
| 2012/0148890 | A1 | 6/2012 | Goto et al. | |
| 2013/0093383 | A1 | 4/2013 | Kim et al. | |
| 2014/0042961 | A1* | 2/2014 | Lan | H02J 7/0068 320/107 |
| 2014/0186667 | A1* | 7/2014 | Lee | H01M 2/345 429/61 |
| 2015/0000991 | A1* | 1/2015 | Lim | H01M 2/34 180/65.31 |
| 2015/0171399 | A1* | 6/2015 | Jeong | H01M 2/18 429/160 |
| 2015/0171410 | A1* | 6/2015 | Shin | H01M 2/345 429/61 |

FOREIGN PATENT DOCUMENTS

| | | |
|---|---|---|
| JP | 2009245879 A | 10/2009 |
| JP | 2011198511 A | 10/2011 |
| KR | 20000051638 A | 8/2000 |
| KR | 20060110576 A | 10/2006 |
| KR | 20070028228 A | 3/2007 |
| KR | 20070075927 A | 7/2007 |
| KR | 20070093165 A | 9/2007 |
| KR | 20110017778 A | 2/2011 |
| KR | 20110093358 A | 8/2011 |
| KR | 20120023369 A | 3/2012 |
| KR | 20130037863 A | 4/2013 |
| KR | 20130040575 A | 4/2013 |
| KR | 101351427 B1 | 1/2014 |
| KR | 20140042269 A | 4/2014 |

OTHER PUBLICATIONS

Extended European Search Report including Written Opinion for Application No. EP16853844.5 dated Jun. 27, 2018.
International Search Repor for Application No. PCT/KR2016/010900 dated Jan. 11, 2017, 2 pages.

* cited by examiner

BATTERY MODULE INCLUDING PROBE FOR DETECTING EXPANSION OF BATTERY CELL

CROSS-REFERENCE TO RELATED APPLICATIONS

The present application is a national phase entry under 35 U.S.C. § 371 of International Application No. PCT/KR2016/010900, filed Sep. 29, 2016, published in Korean, which claims the benefit of Korean Patent Application No. 10-2015-0140182, filed Oct. 6, 2015, with the Korean Intellectual Property Office, all of which are incorporated herein by reference.

TECHNICAL FIELD

The present invention relates to a battery module that includes a probe for detecting expansion of a battery cell.

BACKGROUND ART

Recently, a rechargeable battery that can be repeatedly charged and discharged has been variously used as an energy source of a wireless mobile device. In addition, the rechargeable battery has attracted attention as an energy source of an electric vehicle, a hybrid electric vehicle, and the like, which have been proposed as a solution to solve air pollution in conventional gasoline vehicles and diesel vehicles using fossil fuels. Thus, types of applications using rechargeable batteries are diversifying due to advantages of rechargeable batteries, and it is expected that rechargeable batteries will be applied to many fields and products in the future.

Such a rechargeable battery can be classified into a lithium ion battery, a lithium ion polymer battery, a lithium polymer battery, and the like depending on a configuration of an electrode and an electrolyte solution, and the use of lithium ion polymer batteries, which are easy to manufacture and have a low possibility of electrolyte leakage, is increasing. In general, the rechargeable batteries are classified into a cylindrical battery and a prismatic battery of which an electrode assembly is embedded in a cylindrical or prismatic metal can, and a pouch-type battery of which an electrode assembly is embedded in a pouch-type case of an aluminum laminate sheet.

Among them, due to high capacity of the battery, enlargement of the size of the case and processing of a thin material are attracting much attention, and accordingly, the pouch-type battery having a stacked or stacked/folded electrode assembly embedded in the pouch-type battery case of the aluminum laminate sheet has been gradually increased in usage due to low manufacturing cost, small weight, and easy shape deformation.

FIG. 1 schematically shows a conventional pouch-type battery. Referring to FIG. 1, a pouch-type rechargeable battery 10 is formed with a structure in which an electrode assembly 30 formed of a positive electrode, a negative electrode, and a separation film that is disposed between the positive electrode and the negative electrode is provided in a pouch-type battery case 20, and two electrode leads 40 and 41 that are electrically connected with positive and negative electrode tabs 31 and 32 of the electrode assembly 30 are exposed to the outside.

The battery case 20 is formed of a case main body 21, and includes a concave receiving portion 23 where the electrode assembly 30 can be received and a cover 22 connected integrally to the main body 21.

A plurality of positive electrode tabs 31 and a plurality of negative electrode tabs 32 are respectively welded to the stack-type electrode assembly 30 and thus coupled to the electrode leads 40 and 41. In addition, the electrode leads 40 and 41 are disposed at an upper end 24 of the case body 21 and an upper end of the cover 22, and insulation films 50 are respectively attached to the electrode leads 40 and 41 to prevent occurrence of a short-circuit.

Such a pouch-type rechargeable battery is widely used as an energy source for various electronic devices as well as various mobile devices. However, when a gas is generated in the charging/discharging process, the battery case is ruptured and harmful gas is leaked, thereby causing unexpected heat or explosion due to malfunction of the battery.

The rechargeable battery and a middle-sized or large-sized battery module including the rechargeable battery are provided with safety devices such as a protection circuit and a fuse for shutting off current during over-charging, over-discharging, and over-current, but cannot detect the amount of gas generated in the battery in real time. Accordingly, the time that the battery case is ruptured cannot be determined and thus the safety is significantly lowered, so that it is difficult to exhibit a desired effect.

DISCLOSURE

Technical Problem

The present invention has been made to solve the above-mentioned problems of the prior art and the technical problems required from the past.

Specifically, in order to prevent an accident in advance by transmitting a warning signal by detecting an internal pressure of a rechargeable battery before a battery case is ruptured, the present invention provides a battery module with a sensing probe at an external surface of battery cells of the rechargeable battery to sense a local expansion change of the battery cell and transmit a signal to generate a warning signal for assuring safety of the battery module when it is determined that the internal pressure exceeds a threshold pressure level based on the transmitted signal.

Technical Solution

A battery module that includes a probe for detecting expansion of a battery cell according to the present invention includes: two or more of rechargeable battery cells; a sensing probe provided at an external surface of at least one of the battery cells to sense a local expansion change of the battery cell and transmitting a signal; and a controller receiving the signal from the sensing probe, estimating an internal pressure of the battery cell from the received signal, and generating a warning signal to assure safety of the battery module when the estimated internal pressure exceeds a threshold pressure level.

That is, the probe may estimate an internal pressure from volume expansion of the battery cell and may transmit a warning signal when the internal pressure exceeds a threshold pressure value before the battery case is ruptured to thereby assure safety of the battery module by preventing an accident.

In one specific example, a battery case of the battery cell is a pouch-type battery case made of a laminated sheet including a resin layer and a metal layer, and an external circumferential side of a receiving portion of an electrode assembly may be closed and sealed while the electrode assembly and an electrolyte are received in the receiving portion.

In this case, the receiving portion may be disposed in a portion that is concave in the pouch-type battery case for embedding of the electrode assembly.

In such a structure, the electrode assembly may have a shape of a hexahedron of which top and bottom sides are relatively large, the receiving portion may be recessed to a depth corresponding to a height of the electrode assembly, and a side surface that provides a depth of the receiving portion may be disposed between the bottom and the external circumference sides that are provided for thermal welding of the receiving portion For example, a side surface of the receiving portion may be inclined at an angle of 45 degrees to 85 degrees with reference to the ground.

In addition, a sensing probe may be provided to contact an outer side of the side surface of the receiving portion.

In this case, the sensing probe may be provided to contact an outer side of a side surface where an electrode terminal of the battery cell is provided among the side surfaces of the receiving portion.

In one specific example, the sensing probe may be provided in at least two battery cells.

According to the present invention, the battery cells may be embedded in the hexahedral module case, and a probe mounting unit may be provided in the module case with a shape that corresponds to an external shape of the sensing probe.

In one specific example, the threshold pressure level may be set in a range that is lower than an internal pressure of the battery cell, at which a sealed portion of the battery case is ruptured.

In this case, the threshold pressure level may be set in a range of 1.5 atm to 3 atm.

Alternatively, the threshold pressure level may be set in a range of 2.5 atm to 3 atm.

According to the present invention, the controller may be a battery management system (BMS) that monitors and controls operation of the battery module.

In one specific example, the warning signal may be an operation control signal that stops operation of the battery module to assure safety of the battery module.

Alternatively, the warning signal may be a recognition signal for a user or a maintenance person of a device where the battery module is installed to visually and audibly recognize a risk to ensure safety of the battery module.

According to the present invention, the device may be a vehicle and the user may be a driver.

The present invention provides a battery pack that includes at least one battery module as a unit module.

The present invention may also provide a device that includes the battery pack as a power source.

The device may be selected from an electric vehicle, a hybrid electric vehicle, a plug-in hybrid electric vehicle, an electric two-wheel vehicle, and an electric golf cart.

The structure and manufacturing method of such a device are well known in the art, so a detailed description thereof will be omitted herein.

MODE FOR INVENTION

Hereinafter, an exemplary embodiment of the present invention is described with reference to the drawings, and is provided for easy understanding of the present invention, but the scope of the present invention is not limited thereto.

Figure 1:
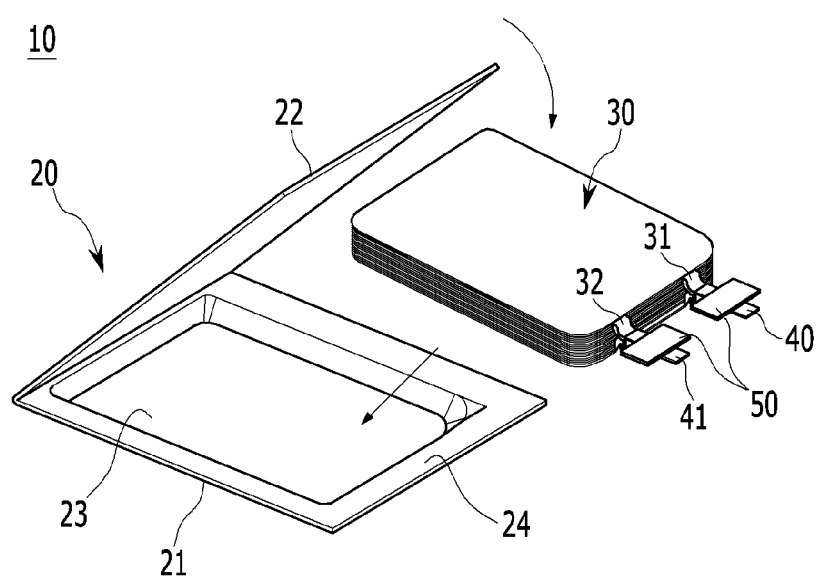
FIG. 1 is a schematic view of a conventional pouch-type rechargeable battery that includes an electrode assembly.
Figure 2:
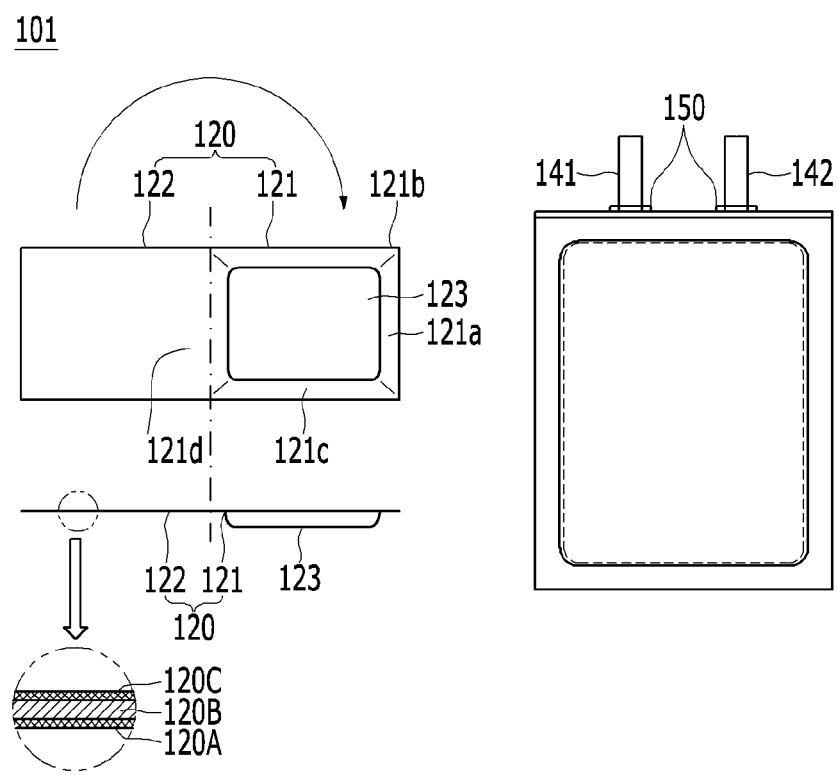
FIG. 2 is a schematic view of a battery cell that forms a battery module according to an exemplary embodiment of the present invention.

FIG. 2 is a schematic view of a battery cell that forms a battery module according to an exemplary embodiment of the present invention.

Referring to FIG. 2, a battery case 120 of a battery cell 101 is formed of a pouch-type case that is made of a laminate sheet including a resin layer and a metal layer, and includes a first case 121 and a second case 122.

The battery case 120 is made of a laminate sheet, and includes an outer resin layer 120A provided in the outmost side, a barrier metal layer 120B that prevents permeation of a material, and an inner resin layer 120C serving for encapsulation.

The battery case 120 is formed with a structure in which an outer circumference of a receiving portion 123 is sealed after an electrode assembly 130 and an electrolyte solution are received in the receiving portion 123.

The receiving portion 123 is provided in a recessed portion of the first case 121, and the second case 122 extends from one end of the first case 121. The second case 122 closes and seals the receiving portion 123 of the first case 121 while being bent in a direction of the arrow.

The electrode assembly 130 has a hexahedron structure of which top and bottom sides are relatively larger than a height thereof.

The receiving portion 123 has a structure in which the first case 121 is partially recessed for installation of the electrode assembly 130. That is, the receiving portion 123 is concave with a depth that corresponds to the height of the electrode assembly 130, and sides that provide the depth of the receiving portion 123 are provided between the bottom side of the receiving portion 123 and external circumferential sides 121a, 121b, 121c, and 121d that are thermally welded to the bottom side of the receiving portion 123.

The external circumferential sides 121a, 121b, 121c, and 121d are disposed along an external circumferential portion of the receiving portion 123 for sealing of the receiving portion 123. That is, the first case 121 and the second case 122 have structures that seal the external circumferential sides 121a, 121b, 121c, and 121d of the receiving portion 123 of the electrode assembly 130.

A positive terminal 141 and a negative terminal 142 coupled to the electrode assembly 130 are disposed in a first external circumferential side 121a that opposes a portion where the first case 121 and the second case 122 are connected.

Insulation films 150 are respectively attached to top and bottom sides of the positive terminal 141 and the negative terminal 142 respectively for insulation.

A second external circumferential side 121b and a third external circumferential side 121c are respectively disposed adjacent to opposite ends of the first external circumferential side 121a, and the second external circumferential side 121b and the third external circumferential side 121c are disposed opposite to each other.

Figure 3:
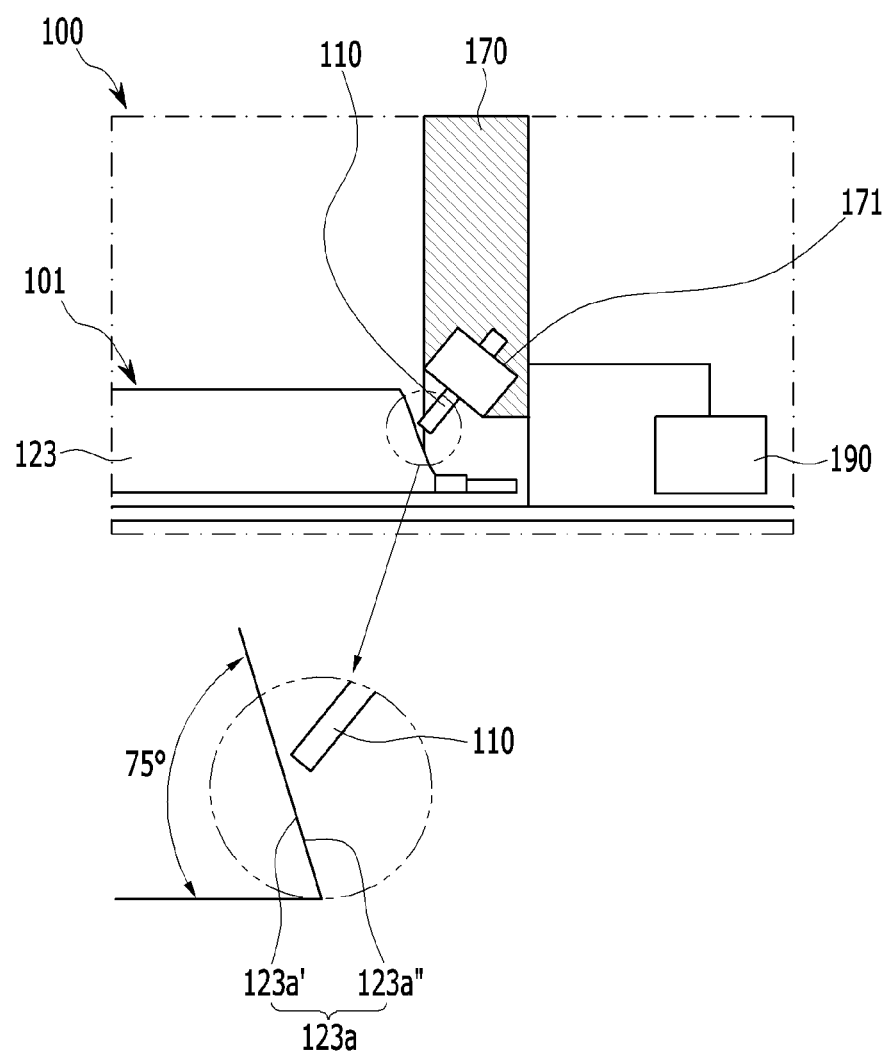
FIG. 3 is a schematic view of the battery module that includes a probe for detecting expansion of the battery cell.

FIG. 3 is a partial schematic view of the battery module that includes a probe that detects a state of the battery cell where an internal pressure is increased and expansion of the battery cell occurs.

Referring to FIG. 3, a battery module 100 includes a sensing probe 110 that senses an internal pressure change of the battery cell 101 and transmits a signal, and a controller 190 that receives the signal from the sensing probe 110 and generates a warning signal for assuring safety of the battery module 100.

A side surface 123a of the receiving portion 123 is inclined at an angle of 75 degrees with respect to the ground, and the sensing probe 110 is disposed to be in contact with an outer surface 123a" of the side surface 123a where the electrode terminals 141 and 142 of the battery cell 101 are disposed.

The side surface 123a of the receiving portion 123 is provided in the outer surface 123a" where the sensing probe 110 faces the side surface 123a of the receiving portion 123 among an inner surface 123a' that contacts the electrode assemble 130 and the outer surface 123a" that contacts the sensing probe 110 such that the sensing probe 110 contacts the outer surface 123a" of the receiving portion 123 as the internal pressure is increased during a charging and discharging process of the battery cell 101.

A module case 170 receives the battery cell 101 therein, and a probe mounting unit 171 having a shape corresponding to an external shape of the sensing probe 110 is provided in the module case 170.

Figure 4:
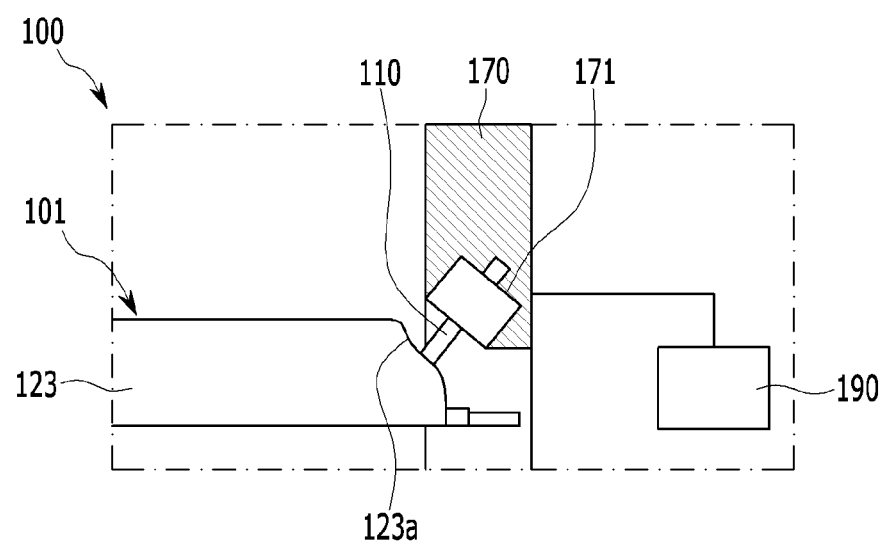
FIG. 4 is a partial schematic view of the battery module in a state that an internal pressure is increased in the battery cell of FIG. 3.
Figure 5:
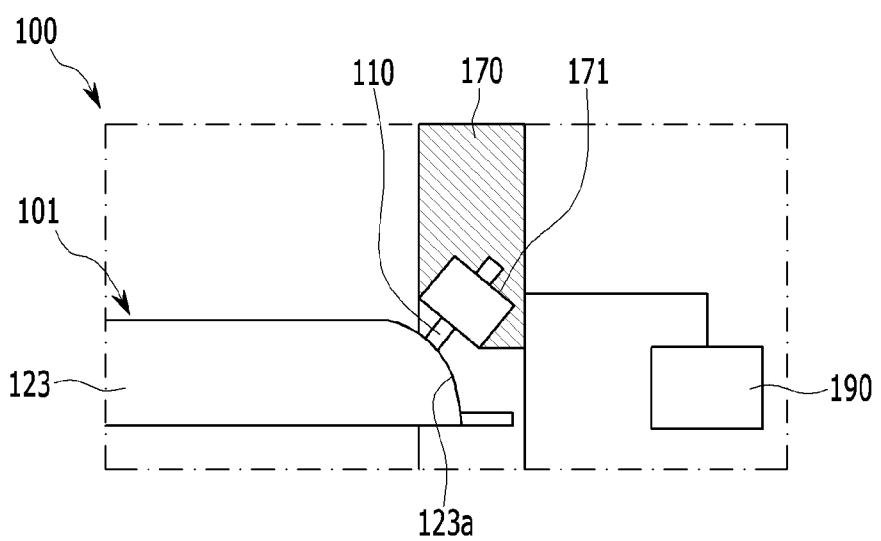
FIG. 5 is a partial schematic view of the battery module in a state that the internal pressure is more increased in the battery cell of FIG. 4.

FIG. 4 is a partial schematic view of the battery module in a state that an internal pressure is increased in the battery cell of FIG. 3, and FIG. 5 is a partial schematic view of the battery module in a state that the internal pressure is more increased in the battery cell of FIG. 4.

Referring to FIG. 4 and FIG. 5, the sensing probe 110 is fixed to the probe mounting unit 171 having a shape that corresponds to an external shape of the sensing probe 110 in the module case 170.

When an internal pressure of the receiving portion 123 is increased, the side surface 123a of the receiving portion 123 expands, and then the sensing probe 110 detects a pressure of the battery cell 101 and transmits a detection result to the controller 190.

Except that the internal pressure is increased and thus the volume of the side surface 123a of the receiving portion 123 is increased, the structure is the same as that of FIG. 3, and therefore the redundant description will be omitted.

Figure 6:
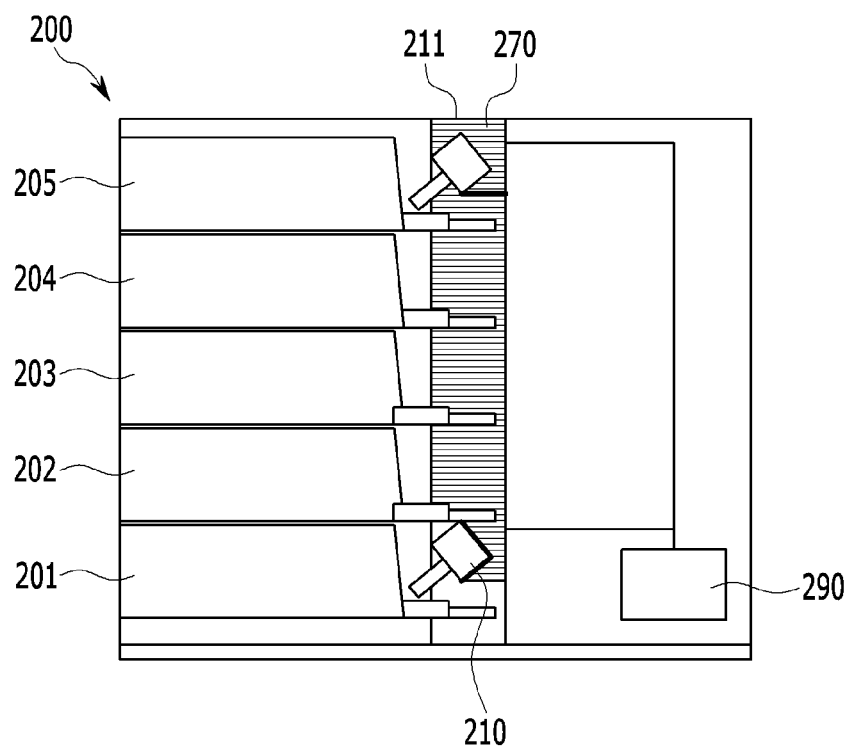
FIG. 6 is a partial schematic view of a battery module according to another exemplary embodiment of the present invention.

FIG. 6 is a partial schematic view of a battery module according to another exemplary embodiment of the present invention.

Referring to FIG. 6, a battery module 200 includes a plurality of rechargeable battery cells 201, 202, 203, 204, and 205, and they are provided in a module case 270. The battery cells 201, 202, 203, 204, and 205 are stacked in a perpendicular direction with reference to the ground.

Sensing probes 210 and 211 are mounted with an inclination that is adjusted according to a thickness of each of the battery cells 201, 202, 203, 204, and 205. The sensing probes 210 and 211 are provided at side surfaces of some (e.g., 201 and 205) of the plurality of battery cells 201, 202, 203, 204, and 205, or may be mounted to side surfaces of the respective battery cells 201, 202, 203, 204, and 205.

The sensing probes 210 and 211 transmit detection signals to a controller 290, and the controller 290 determines whether to generate a warning signal when an internal pressure exceeds a threshold pressure level.

The structure of the battery module 200 is the same as that of the above-described battery module, except that the sensing probes 210 and 211 are provided in the plurality of battery cells 201, 202, 203, 204, and 205, and therefore the redundant description will be omitted.

It will be apparent to those skilled in the art that various modifications and variations can be made in the present invention based on the above description.

INDUSTRIAL APPLICABILITY

As described above, the battery module that includes the probe that senses expansion of the battery cell estimates an internal pressure from local volume expansion of the battery cell and transmits a warning signal when the internal pressure exceeds the threshold pressure value before the battery case is ruptured to thereby assure safety of the battery module by preventing an accident.

Accordingly, the lifetime and safety of the battery module can be improved.

The invention claimed is:

1. A battery module comprising:
a module case;
two or more rechargeable battery cells embedded in the module case, wherein each of the two or more rechargeable battery cells is a pouch-type battery case having a receiving portion, and an electrode assembly and an electrolyte are received in the receiving portion, wherein the electrode assembly has a shape of a hexahedron of which top and bottom sides are relatively large, the receiving portion is recessed to a depth corresponding to a height of the electrode assembly, and a side surface that provides a depth of the receiving portion is disposed between bottom and external circumference sides that are provided for thermal welding of the receiving portion;
two or more sensing probes, wherein each sensing probe is provided at an external surface of each battery cell, respectively, to sense a local expansion change of the respective battery cell and to transmit a signal, wherein each sensing probe is provided to contact an outer side of the side surface of the receiving portion of the respective battery cell;
two or more probe mounting units in the module case, wherein each probe mounting unit has a shape that corresponds to an external shape of each of the two or more sensing probes, respectively; and
a controller to receive the signal from each of the two or more sensing probes, to estimate an internal pressure of the battery cell from the received signal, and to generate a warning signal to assure safety of the battery module when the estimated internal pressure exceeds a threshold pressure level,
wherein in of each of the two or more rechargeable battery cells, the respective sensing probe contacts the outer side of the side surface of the receiving portion where an electrode terminal of the battery cell is provided among the side surfaces of the receiving portion.

2. The battery module of claim 1, wherein each pouch-type battery case is made of a laminated sheet including a resin layer and a metal layer, and the external circumferential side of the receiving portion is closed and sealed.

3. The battery module of claim 2, wherein the receiving portion of each of the two or more rechargeable battery cells is disposed in a portion that is concave in the pouch-type battery case for embedding of the electrode assembly.

4. The battery module of claim 1, wherein the side surface of the receiving portion of each of the two or more rechargeable battery cells is inclined at an angle of 45 degrees to 85 degrees with reference to the bottom side of the receiving portion.

5. The battery module of claim 1, wherein the threshold pressure level is set in a range that is lower than an internal pressure of the battery cell, at which a sealed portion of the battery case is ruptured.

6. The battery module of claim 5, wherein the threshold pressure level is set in a range of 1.5 atm to 3 atm.

7. The battery module of claim 5, wherein the threshold pressure level is set in a range of 2.5 atm to 3 atm.

8. The battery module of claim 1, wherein the controller is a battery management system (BMS) that monitors and controls operation of the battery module.

9. The battery module of claim 1, wherein the warning signal is an operation control signal that stops operation of the battery module to assure safety of the battery module.

10. The battery module of claim 1, wherein the warning signal is a recognition signal for a user or a maintenance person of a device where the battery module is installed to visually and audibly recognize a risk to ensure safety of the battery module.

11. The battery module of claim 10, wherein the device is a vehicle and the user is a driver.

12. A battery pack comprising the battery module of claim 1 as a unit module.

13. A device comprising the battery pack of claim 12 as a power source.

14. The battery module of claim 1, wherein, when the local expansion change of the battery cell is absent, a gap is provided between the sensing probe and the outer side of the side surface of the respective receiving portion where the electrode terminal of the battery cell is provided.

15. The battery module of claim 1, wherein each of the two or more sensing probes is mounted at an inclination with respect to the battery cell with which it is provided to contact.

* * * * *